United States Patent [19]  
Yamabe et al.

[11] Patent Number: 4,666,190  
[45] Date of Patent: May 19, 1987

[54] TUBE JOINT

[75] Inventors: Yasuo Yamabe, Moriyama; Kiyoshi Miura, Kyoto, both of Japan

[73] Assignee: Sekisui Kagaku Kogyo Kabushiki Kaisha, Osaka, Japan

[21] Appl. No.: 753,475

[22] Filed: Jul. 10, 1985

[30] Foreign Application Priority Data

Jul. 13, 1984 [JP] Japan .............................. 59-106581[U]  
Jul. 13, 1984 [JP] Japan .............................. 59-106582[U]

[51] Int. Cl.⁴ ........................................... F16L 33/23  
[52] U.S. Cl. ...................................... 285/93; 285/248; 285/257; 285/322; 285/921; 285/330; 285/423  
[58] Field of Search .................... 285/248, 22, 93, 247, 285/257, 322, 323, 330, 331, 423, DIG. 22, 249, 259

[56] References Cited

U.S. PATENT DOCUMENTS

| 1,200,118 | 10/1916 | Keeler | 285/247 |
|---|---|---|---|
| 2,300,464 | 11/1942 | Parker | 285/248 |
| 2,423,632 | 7/1947 | Ansorge | 285/249 |
| 2,440,178 | 4/1948 | Lofquist | 285/249 |
| 2,470,538 | 5/1949 | Wolfram et al. | 285/249 |
| 2,525,616 | 10/1950 | Peeps | 285/247 |
| 2,561,827 | 7/1951 | Soos | 285/248 |
| 2,956,819 | 10/1960 | Sies | 285/93 |
| 2,978,262 | 4/1961 | Franck | 285/248 |
| 3,140,106 | 7/1964 | Thomas et al. | 285/248 |
| 3,264,012 | 8/1966 | Giovanazzi et al. | 285/93 |
| 3,498,646 | 3/1970 | DePuy | 285/343 |
| 3,545,794 | 12/1970 | Wise | 285/248 |
| 3,575,447 | 4/1971 | Merkle | 285/248 |
| 3,659,880 | 5/1972 | Goldsobel | 285/248 |
| 3,836,700 | 9/1974 | Niemeyer | 285/248 |
| 4,000,918 | 1/1977 | Reker | 285/93 |
| 4,083,587 | 4/1978 | Leczycki | 285/343 |
| 4,162,802 | 7/1979 | Cox | 285/343 |

FOREIGN PATENT DOCUMENTS

| 1384384 | 11/1964 | France | 285/249 |
|---|---|---|---|
| 740278 | 11/1955 | United Kingdom | 285/248 |
| 1014979 | 12/1965 | United Kingdom | 285/248 |

Primary Examiner—Andrew V. Kundrat  
Assistant Examiner—Eric K. Nicholson  
Attorney, Agent, or Firm—Armstrong, Nikaido, Marmelstein & Kubovcik

[57] ABSTRACT

A tube joint comprising (1) a tube joint body including a tubular guide, on at least one side thereof, for receiving a tube thereon, said guide having a groove in the circumference of the end portion thereof, (2) a clamping ring including a tubular portion which has external threads and a plurality of slits extending from said external threads to the end portion thereof in the direction of the axis, said tubular portion being concentrically positioned around the guide of the tube joint body with a space therebetween which is large enough to receive the tube therein in such a manner that the end portion of the tubular portion containing the slit area corresponds to the groove in the guide, and (3) a cap nut having internal threads in one end portion thereof, which engage with the external threads of the clamping ring, and the tapered portion of the interior surface of the other end portion having an aperture therein which is greater in diameter than the outer diameter of the tube, tightening of said cap nut ot said clamping ring resulting in a decrease in the diameter of the clamping ring in the end portion of the slit area.

8 Claims, 10 Drawing Figures

TUBE JOINT

BACKGROUND OF THE INVENTION

1. Field of the Invention

This invention relates to a tube joint for the rapid and secure connection of synthetic resin tubes, resulting in an excellent water-tight system and fastening therebetween.

2. Description of the Prior Art

A tube joint for the connection of a flexible tube of plastics such as polyethylene to a fixed pipe is disclosed in Japanese Laid Open Publication No. 53-16915 (16915/1978), wherein as shown in FIG. 7, external threads 311 of the end portion of a connection cylinder 314, which has an internal groove 331 receiving a ring packing 310 therein, engage with internal threads 330 of a cap nut, so that the diameter of a clamping ring 313 positioned between the cylinder 314 and the cap nut 312 is reduced to thereby deform an area of the synthetic resin tube 317 in accordance with a groove 315 which is positioned in the circumference of a tubular core 316 inserted into the end portion of the tube 317. In order to attain an excellent water-tight system between the tube joint and the tube 317, the inner diameter of the ring packing 310 must be smaller than the outer diameter of the tube 317 so that the ring packing 310 comes into tight contact with the tube 317, resulting in the detachment of the ring packing 310 from the internal groove 331 to cause an inferior water-tight system.

Another tube joint is disclosed in Japanese Laid Open Publication No. 51-72221, wherein as shown in FIGS. 8 to 10, one end portion of a synthetic resin tube 322 which receives, in advance, a cap 320 and a nut 321 thereon is positioned onto a tubular guide 319 of a tube joint body 318 and then the nut 321 is screw-threaded with external threads 323 of the tube joint body 318, thereby decreasing the diameter of the cap 320 to attain a water-tight system between the guide 319 and the tube 322. However, the cap 320 comes into contact with the tapered portion 324 of the nut 321 in a large area, so that the tube 322 turns around the guide 319 together with the cap 320 as the nut 321 is rotated around the cap 320, resulting in a twisting of the tube 322 creating a constriction thereof.

SUMMARY OF THE INVENTION

The tube joint of this invention which overcomes the above-discussed and numerous other disadvantages and deficiencies of the prior art, comprises: (1) a tube joint body including a tubular guide, on at least one side thereof, for receiving a tube thereon, said guide having a groove in the circumference of the end portion thereof, (2) a clamping ring including a tubular portion which has external threads and a plurality of slits extending from said external threads to the end portion thereof in the direction of the axis, said tubular portion being concentrically positioned around the guide of the tube joint body with a space therebetween which is large enough to receive the tube therein in such a manner that the end portion of the tubular portion containing the slit area corresponds to the groove in the guide, and (3) a cap nut having internal threads in one end portion thereof, which engage with the external threads of the clamping ring, and the tapered portion of the interior surface of the other end portion having an aperture therein which is greater in diameter than the outer diameter of the tube, tightening of said cap nut to said clamping ring resulting in a decrease in the diameter of the clamping ring in the end portion of the slit area.

A ring packing is, in a preferred embodiment, set in said groove in the guide.

The outer diameter of the ring packing, in a preferred embodiment, is approximately equal to or smaller than that of said guide.

The tube joint body includes, in a preferred embodiment, a polygonal portion which is concentric with said guide extending therefrom.

The clamping ring includes, in a preferred embodiment, a flange portion which extends to the tubular portion to engage with said polygonal portion of the tube joint body in such a manner to insert said polygonal portion into said flange portion.

Locking means are, in a preferred embodiment, disposed on the exterior surface of said polygonal portion of the tube joint body and the interior surface of said flange portion of the clamping ring, respectively, to engage with each other at insertion of said polygonal portion into said flange portion.

One of the locking means is, in a preferred embodiment, composed of a set of indents and the other is, in a preferred embodiment, composed of a set of projections.

The locking means are, in a preferred embodiment, symmetrically positioned with respect to the axis of the tube joint body.

A projection line is, in a preferred embodiment, circumferentially disposed on the interior surface of the end portion of the clamping ring containing the slit area.

One or more holes are, in a preferred embodiment, disposed in the area of said tubular portion in the vicinity of said flange portion.

Thus, the invention described herein makes possible the objects (1) providing a tube joint for the rapid and secure connection of tubes to attain an excellent water-tight system and fastening therebetween; (2) providing a tube joint which attains a rapid and secure connection of tubes without twisting and constricting the tubes; (3) providing a tube joint which is excellent in operability such that a clamping ring engages, first, with a tube joint body and then a plastic tube is put onto a tubular guide in the tube joint body and thereafter a cap nut is screw-threaded with the clamping ring, thereby attaining a tight connection of the tube to a pipe system; (4) providing a tube joint comprising a tube joint body, a clamping ring and a cap nut, each of which is of a different part and can be repeatedly used if molded of engineering plastics having excellent mechanical strength such as polyamide, polyacetal or the like; (5) providing a tube joint in which a ring packing in the tubular guide is not detached from the guide at the time when a plastic tube is put onto the guide; (6) providing a tube joint which attains a rapid and secure engagement of the clamping ring with the tube joint body; and (7) providing a tube joint in which the extent of receipt of the tube onto the guide can be observed.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
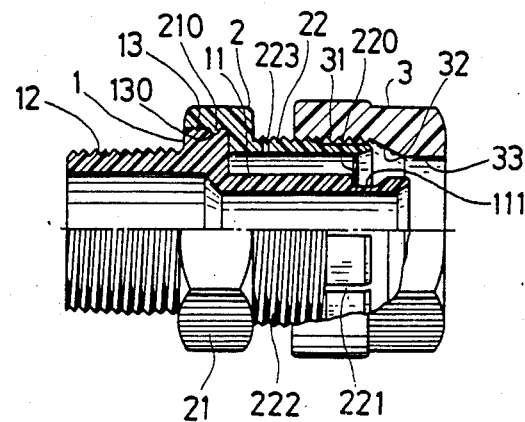
FIG. 1 is a partly sectional side view of a tube joint of this invention.

FIG. 1 shows a tube joint of this invention, which comprises a tube joint body 1, a clamping ring 2 and a cap nut 3.

The tube joint body 1 includes a polygonal portion such as a hexagonal nut 13 in the center portion thereof, from one side of which a tubular guide 11 extends to receive a plastic tube 4 (shown in FIG. 2) thereon and from the other side of which a connection part 12 extends to be connected to a valve, etc. A groove 111 is disposed in the circumference of the end portion of the tubular guide 11. The shape of the groove 111 is not limited to an inverted trapezoid shown in FIG. 1, a rectangular shape and a half circular shape can be used therefor. The depth of the groove 111 is preferably half of the thickness of the tube 4 although it depends upon the thickness of the guide 11. The outer diameter of the guide 11 is approximately equal to or smaller than the inner diameter of the tube 4. Even though the outer diameter of the guide 11 is smaller to a certain extent than the inner diameter of the tube 4, a sufficient water-tight system between the guide 11 and the tube 4 can be attained since an area of the tube 4 corresponding to the end portion of the clamping ring 2 is deformed in accordance with the groove 111 in the guide 11 in a manner as described later. The plastic tube 4 is made of polyethylene, crosslinked polyethylene, etc. It can have a triple layered structure which consists of a central metal layer of aluminum, etc., and an outer and inner crosslinked polyethylene layer sandwiching the metal layer therebetween. The tube joint body 1 is molded of a resin material having an excellent heat resistance and an excellent mechanical strength, an example of which is an engineering plastic such as polyamide, polyethersulfone, polyether-imide, FRP (i.e., a mixture of polyphenylenesulfide and glass fibers).

The clamping ring 2 comprises a flange portion 21 and a tubular portion 22 which has external threads 222 and a plurality of slits 221 extending from the external threads 222 to the end portion thereof in the direction of the axis. The outside of the flange portion 21 is of a polygonal shape, e.g., a hexagon which can attain an engagement thereof with a tool such as a wrench, while the inside of one end portion of the flange 21 is of a polygonal shape, e.g., a hexagon corresponding to the polygonal nut 13 of the tube joint body 1, so that the flange portion 21 can engage with the nut 13 of the tube joint body 1. Locking means 130 (e.g., indents) and 210 (e.g., projections) are disposed on the exterior surface of the nut 13 and the interior surface of the flange portion 21, respectively, in such a manner that they are symmetrical with each other with respect to the axis of the tube joint body 1. Thus, a secure engagement of the flange portion 21 with the nut 13 can be attained even though a slight clearance exists therebetween. The flange portion 21 is covered with a metal ring as desired to prevent the deformation and/or the abrasion thereof due to the repeated use of a tool such as a wrench. The tubular portion 22 of the clamping ring 2 is positioned around the tubular guide 11 of the tube joint body 1 with a space therebetween which is large enough to receive the tube 4 therein in such a manner that the end portion of the slit area 221 corresponds to the groove 111 in the guide 11, and thus the diameter of the tubular portion 22 in the end portion of the slit area 221 can be reduced due to pressure from the tapered portion of the interior surface of the cap nut 3 to the slit area 221. In order to more securely fasten the tube 4 around the groove 111 in the guide 11 by means of the end portion of the tubular portion 22, a projection line 220 is circumferentially disposed on the interior surface of the end portion of the tubular portion 22 containing the slit area 221.

The external threads 222 of the tubular portion 22 are of a triangular screw threaded shape, a buttress threaded shape, etc., but are not limited thereto. The buttress threads are especially advantageous in that they can prevent the cap nut 3 from loosening from the external threads 222 of the tubular portion 22. One or more holes 223 are disposed in the area of the tubular portion 22 in the vicinity of the flange portion 21, so that the extent of receipt of the tube 4 onto the tubular guide 11 of the tube joint body 1 can be observed.

The cap nut 3 has internal threads 31 in one end portion, which are screw-threaded with the external threads 222 of the tubular portion 22, and the tapered portion 32 of the interior surface of the other end portion thereof having an aperture 33 therein which is greater in diameter than the outer diameter of the tube 4. The tapered portion 32 is inwardly bevelled extending to the end of the internal threads 31.

Thus, the flange portion 21 of the clamping ring 2 is engaged with the nut 13 in the tube joint body 1 to create a space, which is large enough to receive the tube 4 therein, between the tubular guide 11 of the tube joint body 1 and the tubular portion 22 of the clamping ring 2, and the internal threads 31 of the cap nut 3 is partly screw-threaded with the external threads 222 of the tubular portion 22, resulting in a tube joint of this invention.

Figure 2:
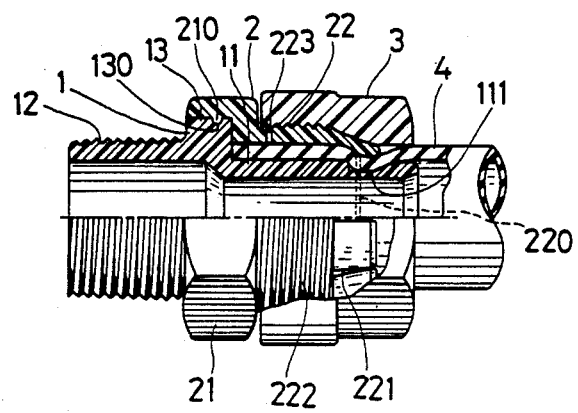
FIG. 2 is a partly sectional side view showing the connection of a plastic tube to the tube joint in FIG. 1.

FIG. 2 shows an embodiment of the operation of the tube joint mentioned above, wherein the connection part 12 of the tube joint body 1 is screw-threaded with a connection element (not shown) such as a valve, first, and then the plastic tube 4 is sufficiently inserted through the aperture 33 of the cap nut 3 into the space between the tubular guide 11 of the tubular joint body 1 and the tubular portion 22 of the clamping ring 2, and thereafter the cap nut 3 is screw-threaded with the external threads 222 of the tubular portion 22 to decrease the diameter of the end portion of the slit area 221 in the tubular portion 22 due to the tapered portion 32 of the cap nut 3, resulting in the deformation of an area of the tube 4 corresponding to the end portion of the tubular portion 22 containing the slit area 221 in accordance with the groove 111 in the guide 11 so that an excellent water-tight system and fastening are attained between the guide 11 and the tube 4. Since the polygonal inside of the flange portion 21 of the clamping ring 2 engages with the polygonal nut 13 of the tube joint body 1 and/or the engaging means 210 on the interior surface of the flange portion 21 engage with the engaging means 130 on the exterior surface of the nut 13, the clamping ring 2 never turns around the guide 11 of the tube joint body 1 when the cap nut 3 is screwthreaded therewith. Moreover, since the aperture 33 of the end portion of the cap nut 3 does not come into contact with the tube 4, it never twists the tube 4.

Figure 3:
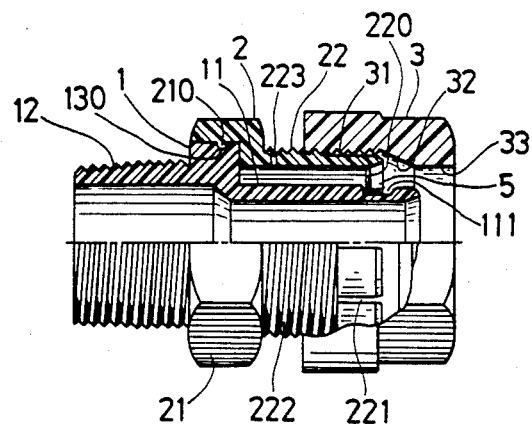
FIG. 3 is a partly sectional side view of another tube joint of this invention.
Figure 4:
FIG. 4 is a partly enlarged sectional side view of the ring packing in the tube joint in FIG. 3.
Figure 5:
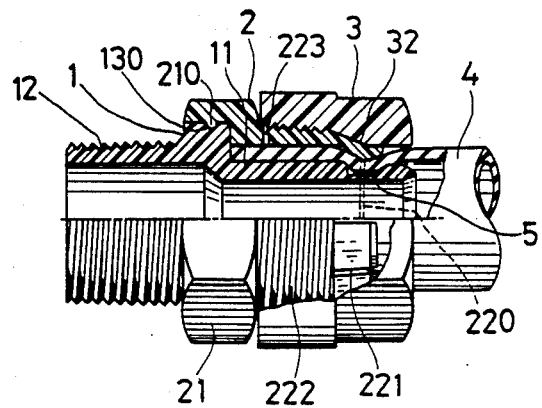
FIG. 5 is a partly sectional side view showing the connection of a plastic tube to the tube joint in FIG. 3.
Figure 6:
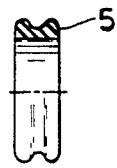
FIG. 6 is a partly enlarged sectional side view of another ring packing.
Figure 7:
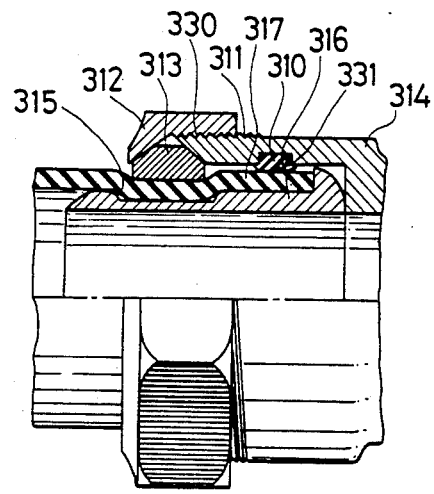
FIG. 7 is a partly sectional side view showing the connection of a tube to a conventional tube joint.
Figure 8:
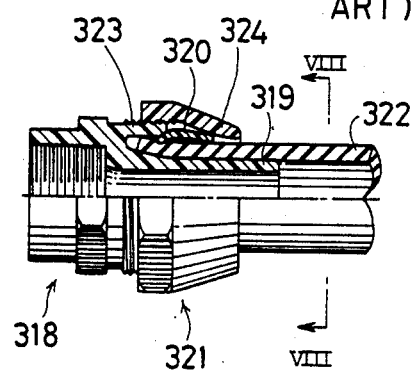
FIG. 8 is a partly sectional side view showing the connection of a tube to another conventional tube joint.
Figure 9:
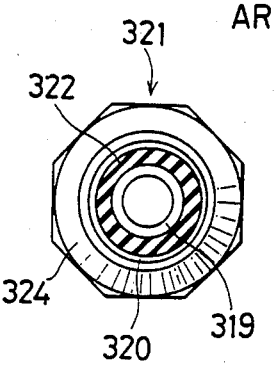
FIG. 9 is a sectional front view of the conventional tube joint at line VIII—VIII in FIG. 8.
Figure 10:
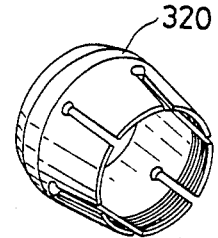
FIG. 10 is a perspective view of a cap in the conventional tube joint in FIG. 8.

FIG. 3 shows another tube joint of this invention, wherein a ring packing 5 made of an elastic material such as rubber is set in the groove 111 of the guide 11. The ring packing 5 is Z-shaped as shown in FIG. 4 or corrugate-shaped as shown in FIG. 6, but is not limited thereto. A circular shape, a square-shape, an oval-shape, etc., can be used. The ring packing 5 serves to bring the tube 4 into tight contact with the guide 11 when engaged with the end portion of the clamping ring 2 the diameter of which is reduced toward the groove 111 in the guide 11, and thus the outer diameter of the ring packing 5 is designed to be approximately equal to or smaller than the outer diameter of the guide 11. As a result, the tube 4 can be easily inserted into the space between the guide 11 and the tubular portion 22 to thereby avoid the detachment of the ring packing 5 from the groove 111. Moreover, by the end of the tubular portion 22, the ring packing 5 is pressed against the area of the tube 4 which is deformed in accordance with the groove 111 in the guide 11, resulting in an excellent water-tight system between the guide 11 and the tube 4. If the ring packing 5 has a self-sealability as shown in FIG. 4, a decrease in the water-tight system between the guide 11 and the tube 4 will be prevented even when the plastic tube 4 is softened and the area thereof corresponding to the ring packing 5 becomes thin due to heat in the case where the tube 4 is used to a piping for transporting a hot water having a temperature of, for example, 80° C. or more, because the ring packing 5 deforms depending upon water pressure within the tube 4 to attain self-sealing.

The above-mentioned Examples describe only the tube joint which comprises the tube joint body 1 including the tubular guide 11 and the polygonal portion 13, the clamping ring 2 including the tubular portion 22 and the flange portion 21, and the cap nut 3. An excellent water-tight system and fastening between the tubular guide 11 and the tube 4 can be, of course, attained even when a tube joint, which comprises the tube joint body 1 composed of the tubular guide 11, the clamping ring 2 composed of the tubular portion 22, and the cap nut 3, is used.

The tube joint body 1 can have a tubular guide extending from each of the two, three or four sides thereof to obtain a bend-, tee-, or cross-shaped tube joint, in addition to the above-mentioned tube joint having the tubular guide 11 from one side of the tube joint body 1.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty which reside in the present invention, including all features which would be treated as equivalents thereof by those skilled in the art to which this invention pertains.

What is claimed is:

1. A tube joint comprising:
   (1) an axially extending tube joint body including a tubular guide, on at least one side thereof, for receiving a tube thereon, and a polygonal portion which is concentric with said guide extending therefrom, said guide having a groove in the circumference of an end portion thereof;
   (2) a clamping ring including a tubular portion which has external threads and a plurality of slits extending from said external threads to an end portion thereof in an axial direction, and a flange portion which extends from said tubular portion with a polygonal shaped bore to engage with said polygonal portion in a manner such that said polygonal portion is inserted into said polygonal shaped bore of said flange portion, said tubular portion being concentrically positioned around the guide of the tube joint body with a space therebetween which is large enough to receive the tube therein in such a manner that the end portion of the tubular portion containing the slits positionally corresponds over the groove in the guide, and
   (3) a cap nut having internal threads in one end portion thereof, which engage with the external threads of the clamping ring, and an internal tapered portion on the other end portion of said capnut having a bore therethrough which is greater in diameter than the outer diameter of the tube, said cap nut being tightened to said clamping ring resulting in a decrease in the diameter of the tubular end portion of the clamping ring containing the slits to hold said tube.

2. A tube joint according to claim 1, wherein a ring packing is set in said groove in the guide.

3. A tube joint according to claim 2, wherein the outer diameter of said ring packing is approximately equal to or smaller than the outer diameter of said guide.

4. A tube joint according to claim 1, wherein a first locking means is disposed on the exterior surface of said polygonal portion of the tube joint body and a second locking means is disposed on the interior surface of said flange portion of the clamping ring, respectively, to engage with each other at insertion of said polygonal portion into said flange portion.

5. A tube joint according to claim 4, wherein one of the locking means is composed of a set of indents and the other is composed of a set of projections.

6. A tube joint according to claim 4 or 5, wherein said locking means are symmetrically positioned with respect to the axis of the tube joint body.

7. A tube joint according to claim 1, wherein a projection line is circumferentially disposed on the interior surface of the end portion of the clamping ring containing the slit area.

8. A tube joint according to claim 1, wherein one or more holes are disposed in the area of said tubular portion in the vicinity of said flange portion.

* * * * *